United States Patent
Abe et al.

(10) Patent No.: US 9,450,249 B2
(45) Date of Patent: Sep. 20, 2016

(54) NON-AQUEOUS ELECTROLYTE SECONDARY BATTERY AND METHOD FOR PRODUCING SAME

(71) Applicant: TOYOTA JIDOSHA KABUSHIKI KAISHA, Toyota-shi, Aichi (JP)

(72) Inventors: Machiko Abe, Okazaki (JP); Masahiro Yoshioka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/780,911

(22) PCT Filed: Mar. 4, 2014

(86) PCT No.: PCT/JP2014/055436
§ 371 (c)(1),
(2) Date: Sep. 28, 2015

(87) PCT Pub. No.: WO2014/162809
PCT Pub. Date: Oct. 9, 2014

(65) Prior Publication Data
US 2016/0056472 A1    Feb. 25, 2016

(30) Foreign Application Priority Data
Apr. 4, 2013   (JP) .................................. 2013-078708

(51) Int. Cl.
| H01M 4/62 | (2006.01) |
| H01M 10/0587 | (2010.01) |
| H01M 4/13 | (2010.01) |
| H01M 10/0567 | (2010.01) |

(Continued)

(52) U.S. Cl.
CPC .............. *H01M 4/628* (2013.01); *H01M 4/13* (2013.01); *H01M 4/62* (2013.01); *H01M 10/0525* (2013.01); *H01M 10/0567* (2013.01); *H01M 10/0587* (2013.01); *H01M 4/133* (2013.01); *H01M 4/366* (2013.01);

(Continued)

(58) Field of Classification Search
CPC ...... H01M 4/13; H01M 4/133; H01M 4/366; H01M 4/62; H01M 4/628; H01M 10/0567; H01M 10/0587; H01M 10/0525; H01M 2004/027; H01M 2220/20; H01M 2300/004; Y02E 60/122; Y02T 10/7011
See application file for complete search history.

(56) References Cited

U.S. PATENT DOCUMENTS

2005/0233222 A1    10/2005   Yanagida et al.

FOREIGN PATENT DOCUMENTS

| JP | 2005-259592 A | 9/2005 |
| JP | 2013-247009 A | 12/2013 |

*Primary Examiner* — Brittany Raymond
(74) *Attorney, Agent, or Firm* — Sughrue Mion, PLLC

(57) ABSTRACT

Provided is a non-aqueous electrolyte secondary battery in which the effect achieved by adding an oxalate complex compound is suitably exhibited and which can achieve battery characteristics during normal usage and resistance to overcharging at high levels. This battery is provided with an electrode body obtained by laminating a positive electrode having a positive electrode active material layer and a negative electrode having a negative electrode active material layer. A coating film which is derived substantially from an oxalate complex compound and which contains boron atoms and/or phosphorus atoms is formed on the negative electrode active material layer. In addition, in the negative electrode active material layer that constitutes the electrode body, the standard deviation (σ) of resistance values, which are measured at a plurality of points at equal intervals in a line direction extending linearly from one prescribed layering surface to the layering surface on the opposite side, is 3.0 to 7.2.

10 Claims, 6 Drawing Sheets

(51) Int. Cl.
*H01M 10/0525* (2010.01)
*H01M 4/133* (2010.01)
*H01M 4/36* (2006.01)
*H01M 4/02* (2006.01)

(52) U.S. Cl.
CPC .. *H01M 2004/027* (2013.01); *H01M 2220/20* (2013.01); *H01M 2300/004* (2013.01); *Y02E 60/122* (2013.01); *Y02P 70/54* (2015.11); *Y02T 10/7011* (2013.01)

NON-AQUEOUS ELECTROLYTE SECONDARY BATTERY AND METHOD FOR PRODUCING SAME

CROSS REFERENCE TO RELATED APPLICATIONS

This application is a National Stage of International Application No. PCT/JP2014/055436 filed Mar. 4, 2014, claiming priority based on Japanese Patent Application No. 2013-078708 filed Apr. 4, 2013, the contents of all of which are incorporated herein by reference in their entirety.

TECHNICAL FIELD

The present invention relates to a secondary battery provided with a non-aqueous electrolyte (a non-aqueous electrolyte secondary battery). More specifically, the present invention relates to a battery in which the negative electrode is provided with a coating film derived from an oxalate complex compound.

Moreover, the present international application claims priority on the basis of Japanese Patent Application No. 2013-78708, which was filed on 4 Apr. 2013, and all the details of that application are incorporated by reference in the present specification.

BACKGROUND ART

In recent years, non-aqueous electrolyte secondary batteries such as lithium ion secondary batteries and nickel hydrogen batteries have been widely used as so-called portable power sources for personal computers, hand-held terminals, and the like, and as power supplies for vehicle propulsion. In particular, light weight lithium ion secondary batteries able to achieve high energy densities can be advantageously used as high output power sources for propelling vehicles such as electric vehicles and hybrid vehicles.

In such non-aqueous electrolyte secondary batteries, a part of the non-aqueous electrolyte (for example, a non-aqueous solvent or supporting electrolyte) decomposes during initial charging, and a coating film comprising a decomposition product thereof (for example, an organic layer of $ROCO_2Li$ or the like, or an inorganic layer of $LiF$, $Li_2O$, or the like) is formed on the surface of the negative electrode active material. This coating film can suppress reductive decomposition of the non-aqueous electrolyte during subsequent charging and discharging, and can improve the durability (for example, the cycle characteristics) of the battery. As a related feature, Patent Literature 1 discloses a lithium ion secondary battery in which a non-aqueous electrolyte contains an oxalate complex compound (for example, lithium bis(oxalato)borate).

CITATION LIST

Patent Literature

Patent Literature 1: Japanese Patent Application Laid-open No. 2005-259592

SUMMARY OF INVENTION

In the battery disclosed in Patent Literature 1, the oxalate complex compound, which has a low reductive decomposition potential, first undergoes reductive decomposition at the negative electrode during charging treatment. In this way, a stable coating film having excellent charge carrier permeability is formed on the surface of the negative electrode active material. As a result, it is possible to stabilize the interface between the non-aqueous electrolyte and the negative electrode, and possible to improve the initial charging and discharging efficiency and durability of the battery.

However, according to investigations by the inventors of the present invention, it was found that film formation irregularities occurred in the non-aqueous electrolyte impregnation direction (for example, in the width direction, which is specified as the direction from one edge towards the other edge in the winding axis direction of the wound electrode body) in the negative electrode of the battery disclosed in Patent Literature 1. If such coating film irregularities occur, a larger current flows in thinner parts of the coating film during charging and discharging. As a result, defects occur, such as localized deterioration of the negative electrode active material and precipitation of charge carriers, and battery characteristics deteriorate. Such occurrences are particularly pronounced in batteries in which high energy density and high input output density are required (for example, vehicle-mounted batteries). Therefore, the formation of a more uniform coating film is required on the surface of the negative electrode active material. Meanwhile, according to new findings by the inventors of the present invention, it was found that in cases where a coating film formed on the surface of the negative electrode active material is too uniform, the temperature inside the battery tends to rise when the battery is in an overcharged state.

With these circumstances in mind, an objective of the present invention is to provide a non-aqueous electrolyte secondary battery in which the effect achieved by adding an oxalate complex compound is maximized and which can achieve superior battery characteristics (for example, achieving battery characteristics during normal usage and resistance to overcharging at high levels). Another related objective of the present invention is to provide a method for producing this battery with excellent productivity and reproducibility.

The inventors of the present invention carried out diligent research in order to solve the problems mentioned above. As a result, the inventors found a means for solving these problems, and completed the present invention.

The present invention provides a non-aqueous electrolyte secondary battery provided with an electrode body, which is obtained by laminating a positive electrode and a negative electrode, with a separator interposed therebetween, and a non-aqueous electrolyte. The negative electrode has a negative electrode active material layer, and a coating film which is derived substantially from an oxalate complex compound and which contains boron atoms and/or phosphorus atoms is formed on the negative electrode active material layer. In addition, in at least a part of the negative electrode active material layer that constitutes the electrode body, the standard deviation ($\sigma$) of resistance values, which are measured at a plurality of measurement points (2 or more points, and preferably 5 or more points) at equal intervals in a line direction extending linearly from one prescribed layering surface of the electrode body to the layering surface on the opposite side, is 3.0 to 7.2 (and preferably 3.0 to 5.0).

In cases where the standard deviation ($\sigma$) is 3.0 or higher, it is possible to incrementally (gradually) generate heat in the negative electrode active material when the battery is in an overcharged state. As a result, it is possible to reduce the quantity of heat generated during overcharging. For example, it is possible to suppress the quantity of heat generated to 23 J or less per 1 $cm^2$ of the negative electrode active material layer. Therefore, it is possible to advantageously suppress an increase in temperature inside the battery and possible to achieve high resistance to overcharging.

In addition, in cases where the standard deviation (σ) is 7.2 or lower (for example, 5.0 or lower), a uniform coating film derived from the oxalate complex compound is formed on the surface of the negative electrode active material, meaning that it is possible to bring about uniform charging and discharging reactions. Therefore, it is possible to achieve excellent battery characteristics (for example, input output characteristics and cycle characteristics) during normal usage.

As mentioned above, the non-aqueous electrolyte secondary battery disclosed here can achieve battery characteristics during normal usage and resistance to overcharging at high levels.

The "resistance value" mentioned above can be measured by, for example, bringing a Luggin tube type counter electrode into contact with a measurement point on the negative electrode active material layer. Specifically, the resistance value can be measured by means of a measurement method that includes the following steps: preparing a Luggin tube type counter electrode; bringing this Luggin tube type counter electrode into contact with a measurement point on the negative electrode active material layer so as to electrically connect the counter electrode with the measurement point on the negative electrode active material layer via the non-aqueous electrolyte; applying an alternating current or alternating voltage between the electrically connected counter electrode and measurement point, and measuring the impedance; and calculating the resistance value on the basis of the impedance measurement result. This measurement method will be explained in detail later.

In addition, the standard deviation (σ) can be the statistical standard deviation defined by the following expression.

$$\sigma = \sqrt{\frac{1}{n}\sum_{i=1}^{n}(x_i - \bar{x})^2} \qquad \text{[Math. 1]}$$

(where, n represents the number of measurement points, $x_i$ represents an ith measurement point value, and $\bar{x}$ represents arithmetic mean of resistance values of all the measurement points.)

Moreover, in the present specification, "non-aqueous electrolyte secondary battery" means a battery provided with a non-aqueous electrolyte that is a liquid at ordinary temperature (for example, 25° C.) (typically an electrolyte that contains a supporting electrolyte in a non-aqueous solvent). In addition, in the present specification, "lithium ion secondary battery" means a secondary battery which uses lithium ions as charge carriers and in which charging and discharging is achieved by transport of lithium ions between the positive and negative electrodes.

In a preferred aspect, the electrode body is a flat wound electrode body which is provided with a strip-shaped positive electrode, which is obtained by forming a positive electrode active material layer having a prescribed width in the longitudinal direction on a strip-shaped positive electrode current collector, and a strip-shaped negative electrode, which is obtained by forming a negative electrode active material layer having a prescribed width in the longitudinal direction on a strip-shaped negative electrode current collector, and a strip-shaped separator, and which is obtained by laminating the strip-shaped positive electrode and the strip-shaped negative electrode, with the separator interposed therebetween, winding in the longitudinal direction, and then squeezing the obtained wound body from the sides. In addition, the resistance value is a resistance value measured at a plurality of measurement points at equal intervals in a line direction extending linearly from one edge towards the other edge in the winding axis direction in the inner flat part, excluding at least the outermost periphery, of the negative electrode active material layer that constitutes the flat wound electrode body.

In conventional wound electrode bodies, coating film formation irregularities readily occur in the central part of the electrode body, where the quantity of non-aqueous electrolyte is low. In addition, batteries provided with wound electrode bodies generally have high energy densities, meaning that measures to tackle overcharging are particularly important. Therefore, use of the invention of the present application is particularly effective for tackling overcharging.

In addition, the present invention provides a method for producing a non-aqueous electrolyte secondary battery such as that described above. This production method includes the following steps:

(1) preparing an electrode body, which is obtained by laminating a positive electrode having a positive electrode active material layer and a negative electrode having a negative electrode active material layer, with a separator interposed therebetween, and a non-aqueous electrolyte containing an oxalate complex compound that contains boron atoms and/or phosphorus atoms;

(2) constructing a battery assembly by housing the electrode body and the non-aqueous electrolyte in a battery case;

(3) holding the constructed battery assembly in a low temperature region at a temperature below 25° C. (for example, 10 to 15° C.) for a prescribed period of time (for example, 5 to 20 hours); and (4) carrying out charging treatment between the positive electrode and the negative electrode.

According to this production method, by carrying out the relatively simple procedure of "holding the constructed battery assembly in a low temperature region for a prescribed period of time", it is possible to stably form a coating film having preferred properties (that is, a coating film in which the standard deviation (σ) of resistance values is 3.0 to 7.2) on the surface of the negative electrode active material layer (specifically, the negative electrode active material). Therefore, according to the production method disclosed here, it is possible to produce a non-aqueous electrolyte secondary battery, which can achieve battery characteristics (for example, cycle characteristics) during normal usage and resistance to overcharging at high levels, with high productivity.

Moreover, "battery assembly" means a state whereby the constituent elements of the battery (that is, the electrode body, the non-aqueous electrolyte and the battery case) are combined, but before charging treatment is carried out.

The oxalate complex compound contained in the non-aqueous electrolyte contains boron atoms (B) and/or phosphorus atoms (P) (hereinafter, this oxalate complex compound is also referred to simply as a "BP-oxalate compound"). The BP-oxalate compound can be, for example, $LiBF_2(C_2O_4)$ represented by formula (I) below, $LiB(C_2O_4)_2$ represented by formula (II) below, $LiPF_4(C_2O_4)$ represented by formula (III) below, or $LiPF_2(C_2O_4)_2$ represented by formula (IV) below. These compounds undergo reductive decomposition at the negative electrode during charging treatment (typically during initial charging treatment), form a high quality coating film having low resistance and excellent stability on the surface of the negative electrode active material, and can be deposited (bound) to the negative electrode active material. Therefore, the effect of the present invention can be exhibited to a high level.

[Chemical Formula 1]

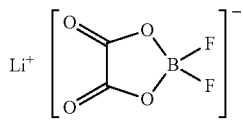

[Chemical Formula 2]

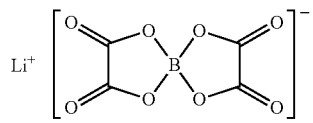

[Chemical Formula 3]

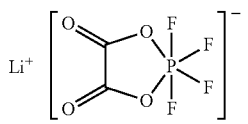

[Chemical Formula 4]

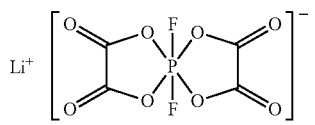

In addition, the present invention provides a battery pack obtained by electrically connecting a plurality of these non-aqueous electrolyte secondary batteries (single batteries) to each other (typically in series). The performance of a battery pack obtained by combining a plurality of single batteries depends on performance of the lowest performance single battery constituting the battery pack. The non-aqueous electrolyte secondary battery disclosed here exhibits smaller fluctuations in performance than conventional batteries and can exhibit highly stable battery characteristics (for example, cycle characteristics). As a result, the non-aqueous electrolyte secondary battery disclosed here can be advantageously used in a battery pack and can exhibit significantly better battery characteristics as a battery pack.

As mentioned above, the non-aqueous electrolyte secondary battery disclosed here (for example, a lithium ion secondary battery) can advantageously exhibit the effect achieved by adding the BP-oxalate compound, and is characterized by being able to achieve battery characteristics during normal usage and resistance to overcharging at high levels. That is, the battery disclosed here can exhibit excellent battery characteristics over a long period of time and can suppress an increase in temperature inside the battery during overcharging. Therefore, the battery disclosed here utilizes these characteristics and can be advantageously used in applications in which high energy density, high output density or high resistance to overcharging are required. An example of such an application is a high output power source for propelling a vehicle. In other words, a vehicle provided with this non-aqueous electrolyte secondary battery is provided as another aspect disclosed here. Moreover, a vehicle-mounted battery can be in the form of the battery pack described above.

DESCRIPTION OF EMBODIMENTS

Figure 1:
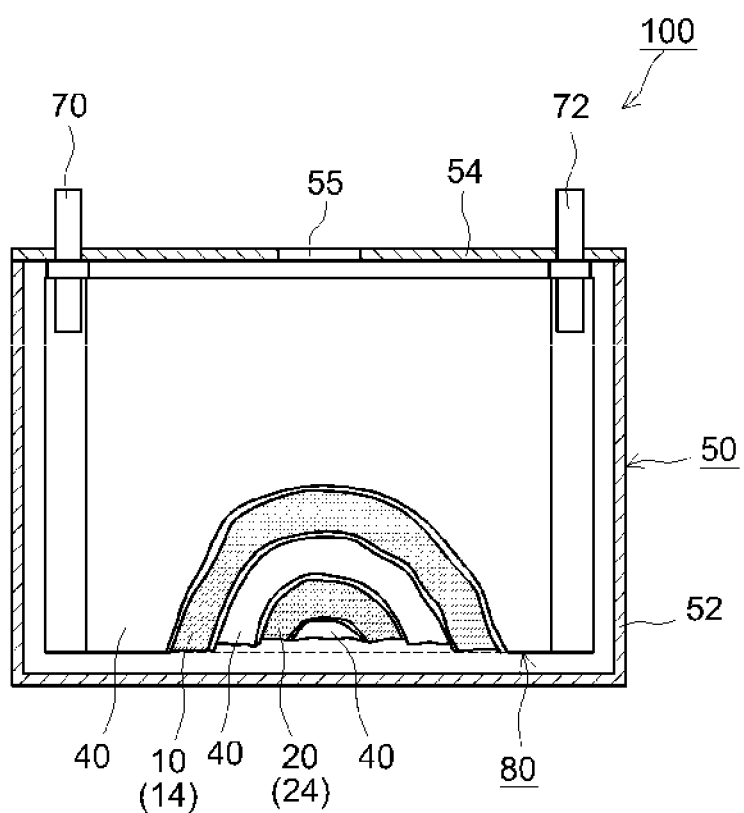
FIG. 1 is a longitudinal sectional view that schematically illustrates the cross sectional structure of a non-aqueous electrolyte secondary battery according to one embodiment.

Preferred embodiments of the present invention will now be explained while referring to the drawings as appropriate. Matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and common general technical knowledge in this technical field. Moreover, in the drawings shown below, components/parts that perform the same action are denoted by the same symbols, and duplicate explanations will be omitted or simplified. In addition, dimensions shown in the drawings (lengths, widths, thicknesses, and so on) do not necessarily reflect actual dimensions.

<<Non-Aqueous Electrolyte Secondary Battery>>

The present invention provides a non-aqueous electrolyte secondary battery. This battery is provided with an electrode body, which is obtained by laminating a positive electrode and a negative electrode, with a separator interposed therebetween, and a non-aqueous electrolyte.

Although not intending to place particular limitations on the present invention, the present invention will now be explained in detail by using, as an example, a non-aqueous electrolyte secondary battery in a form whereby a flat wound electrode body (a wound electrode body) and a non-aqueous electrolyte are housed in a flat rectangular container (a battery case) as the configuration of a non-aqueous electrolyte secondary battery according to one embodiment of the present invention.

The configuration of a non-aqueous electrolyte secondary battery according to one embodiment of the present invention is shown in FIG. 1. FIG. 1 is a longitudinal sectional view that schematically illustrates the cross sectional structure of a non-aqueous electrolyte secondary battery 100. As shown in FIG. 1, the non-aqueous electrolyte secondary battery 100 has a constitution whereby an electrode body (a wound electrode body) 80, which is obtained by flatly winding a strip-shaped positive electrode sheet 10 and a strip-shaped negative electrode sheet 20, with a strip-shaped separator sheet 40 interposed therebetween, and a non-aqueous electrolyte (not shown) are housed in a battery case 50 having a shape able to house the wound electrode body (a flat box-like shape).

<<Battery Case 50>>

The battery case 50 is provided with a flat rectangular (box-shaped) battery case main body 52, the top of which is open, and a lid 54 that seals this open part. The upper surface (that is, the lid 54) of the battery case 50 is provided with a positive electrode terminal 70 for external connections, which is electrically connected to the positive electrode sheet 10 of the wound electrode body 80, and a negative electrode terminal 72 that is electrically connected to the negative electrode sheet 20 of the wound electrode body 80. In the same way as battery cases of conventional non-aqueous electrolyte secondary batteries, the lid 54 is provided with a safety valve 55 for discharging gas generated inside the battery case 50 to outside the battery case 50.

Examples of materials for the battery case 50 include metal materials such as aluminum or steel; and resin materials such as poly (phenylene sulfide) resins and polyimide resins. Of these, a relatively lightweight metal (for example, aluminum or an aluminum alloy) is preferred from the perspectives of improving heat dissipation properties and increasing energy density. In addition, the shape of the case (the external shape of the container) is rectangular in this case, but may also be round (cylindrical, coin-shaped or button-shaped), hexahedral (cuboid or cubic), bag-shaped or a deformed shape obtained by processing these shapes.

<<Wound Electrode Body 80>>

Figure 2:
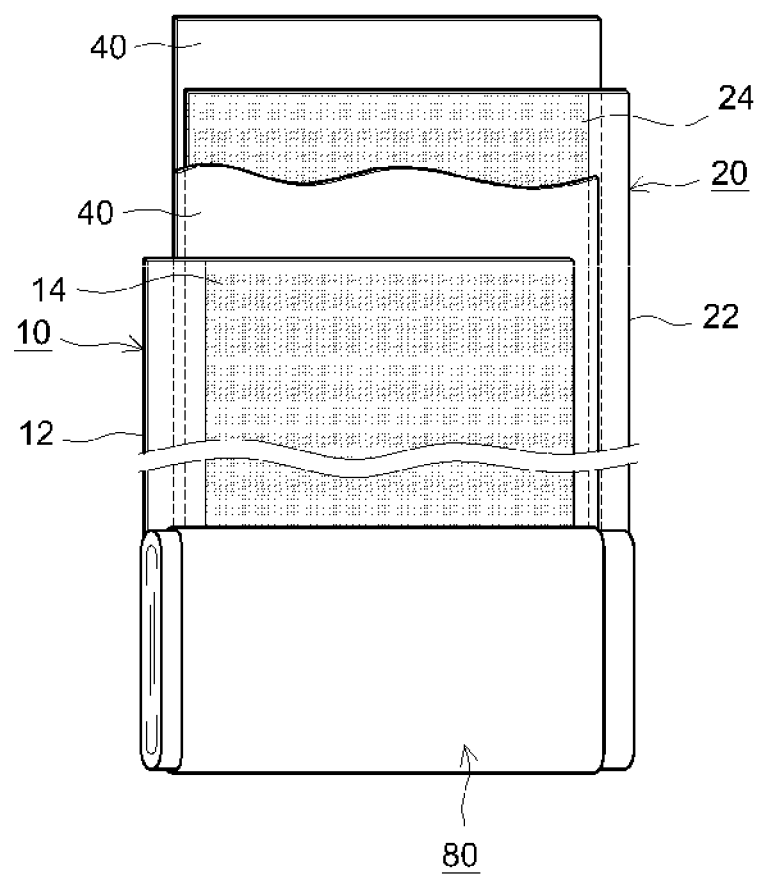
FIG. 2 is a schematic diagram that shows the constitution of a wound electrode body according to one embodiment.

FIG. 2 is a schematic diagram that shows the constitution of the wound electrode body 80 in FIG. 1. As shown in FIG. 2, the wound electrode body 80 according to the present embodiment is provided with the long sheet-like positive electrode (positive electrode sheet) 10 and the long sheet-like negative electrode (negative electrode sheet) 20 at a stage prior to assembly. The positive electrode sheet 10 is provided with a strip-shaped positive electrode current collector 12 and a positive electrode active material layer 14, which is provided on at least one surface (and typically both surfaces) of the strip-shaped positive electrode current collector 12 and which is formed in the longitudinal direction of the strip-shaped positive electrode current collector 12. The negative electrode sheet 20 is provided with a strip-shaped negative electrode current collector 22 and a negative electrode active material layer 24, which is provided on at least one surface (and typically both surfaces) of the strip-shaped negative electrode current collector 22 and which is formed in the longitudinal direction of the strip-shaped negative electrode current collector 22. In addition, a separator 40 that prevents direct contact between the positive electrode active material layer 14 and the negative electrode active material layer 24 is provided between the positive electrode active material layer 14 and the negative electrode active material layer 24. Here, two long sheet-like separators 40 are used.

This type of wound electrode body 80 can be produced by, for example, winding a laminate, which is obtained by overlaying the positive electrode sheet 10, a separator sheet 40, the negative electrode sheet 20 and the two separator sheets 40 in that order, in the longitudinal direction, and squeezing the obtained electrode body from the sides so as to form a flat shape.

A tightly laminated wound core part, which is obtained by overlaying the positive electrode active material layer 14 formed on the surface of the positive electrode current collector 12 and the negative electrode active material layer 24 formed on the surface of the negative electrode current collector 22, is formed in the central part in the width direction, which is specified as the direction from one edge towards the other edge in the winding axis direction of the wound electrode body 80. In addition, a positive electrode active material layer-non-forming part of the positive electrode sheet 10 and a negative electrode active material layer-non-forming part of the negative electrode sheet 20 protrude outwards from the wound core part at both edges of the wound core part in the winding axis direction of the wound electrode body 80. In addition, a positive electrode current collector plate is provided on the protruding part on the positive electrode side, a negative electrode current collector plate is provided on the protruding part on the negative electrode side, and the positive electrode terminal 70 (in FIG. 1) is electrically connected to the negative electrode terminal 72 (in FIG. 1).

<<Positive Electrode Sheet 10>>

The positive electrode sheet 10 is provided with the positive electrode current collector 12 and the positive electrode active material layer 14, which is formed on the positive electrode current collector 12 and contains at least the positive electrode active material. An electrically conductive member consisting of a metal exhibiting good electrical conductivity (for example, aluminum, nickel, titanium or stainless steel) can be advantageously used as the positive electrode current collector 12.

<Positive Electrode Active Material Layer 14>

The positive electrode active material layer 14 contains at least the positive electrode active material. One or two or more materials known to be able to be used as positive electrode active materials for non-aqueous electrolyte secondary batteries can be used without particular limitation as the positive electrode active material. Preferred examples thereof include, for example, layered spinel type lithium complex oxides (represented by $LiNiO_2$, $LiCoO_2$, $LiFeO_2$, $LiMn_2O_4$, $LiNi_{0.5}Mn_{1.5}O_4$, $LiCrMnO_4$) and olivine type materials (for example, $LiFePO_4$).

Of these, a lithium-nickel-cobalt-manganese complex oxide which contains Li, Ni, Co and Mn and which has a layered structure (typically a layered rock salt structure belonging to the hexagonal system) (for example, $LiNi_{1/3}Co_{1/3}Mn_{1/3}O_2$) can be advantageously used. This type of compound exhibits excellent thermal stability and can achieve higher energy densities than other types of material.

Here, the lithium-nickel-cobalt-manganese complex oxide encompasses not only oxides containing only Li, Ni, Co and Mn as constituent metallic elements, but also oxides that contain at least one type of metallic element other than Li, Ni, Co and Mn (that is, transition metal elements other than Li, Ni, Co and Mn and/or typical metallic elements). Such metallic elements include one or two or more types selected from among magnesium (Mg), calcium (Ca), strontium (Sr), titanium (Ti), zirconium (Zr), vanadium (V), niobium (Nb), chromium (Cr), molybdenum (Mo), tungsten (W), iron (Fe), rhodium (Rh), palladium (Pd), platinum (Pt), copper (Cu), zinc (Zn), boron (B), aluminum (Al), gallium (Ga), indium (In), tin (Sn), lanthanum (La) and cerium (Ce). The added quantity (blending quantity) of these metallic elements is not particularly limited, but can generally be 0.01 to 5 mass % (for example, 0.05 to 2 mass %, and typically 0.1 to 0.8 mass %). By setting the added quantity to fall within this range, it is possible to achieve excellent battery characteristics (for example, high energy density).

In addition, a lithium-transition metal composite oxide having a spinel structure, which is represented by the general formula $LiMn_{2-p}M_pO_4$ (in the formula, p is such that $0 \leq p < 2$, and typically such that $0 \leq p \leq 1$ (for example, $0.2 \leq p \leq 0.6$), can be given as another preferred embodiment. In cases where p is greater than 0, M may be a metallic element other than Mn or a non-metallic element. A composition in which M includes at least one type of transition metal element (for example, one or two or more types selected from among Ti, Cr, Fe, Co, Ni, Cu and Zn) is preferred. By using such a compound, it is possible to set the operating potential of the positive electrode to be approximately 4.5 V or higher (and especially 4.6 V or higher, for example, 4.7 V or higher), which is higher than that in a conventional non-aqueous electrolyte secondary battery (in which the upper limit for the operating potential is approximately 4.1 to 4.2 V). Therefore, it is possible to achieve significantly higher energy density.

In addition to the positive electrode active material, the positive electrode active material layer 14 may, if necessary, contain one or two or more materials able to be used as constituent components of the positive electrode active material layers 14 in conventional non-aqueous electrolyte secondary batteries. Examples of such materials include electrically conductive materials and binders. Electrically conductive materials able to be advantageously used include carbon materials such as various types of carbon black (typically acetylene black and ketjen black), coke coal, activated carbon, graphite, carbon fibers and carbon nanotubes. In addition, a vinyl halide-based resin such as poly(vinylidene fluoride) (PVdF); a poly(alkylene oxide) such as poly(ethylene oxide) (PEO), or the like can be advantageously used as the binder.

The proportion of the positive electrode active material relative to the overall positive electrode active material layer 14 is generally approximately 60 mass % or more (typically 60 to 99 mass %), and it is generally preferable for this proportion to be approximately 70 to 95 mass %. In cases where an electrically conductive material is used, the proportion of the electrically conductive material relative to the overall positive electrode active material layer 14 can be approximately 2 to 20 mass %, and it is generally preferable for this proportion to be approximately 3 to 10 mass %. In cases where a binder is used, the proportion of the binder relative to the overall positive electrode active material layer 14 can be, for example, approximately 0.5 to 10 mass %, and it is generally preferable for this proportion to be approximately 1 to 5 mass %.

The mass of the positive electrode active material layer 14 provided per unit area of the positive electrode current collector 12 (that is, the mass per unit area) should be 3 $mg/cm^2$ or higher (for example, 5 $mg/cm^2$ or higher, and typically 10 $mg/cm^2$ or higher) on each side of the positive electrode current collector 12 from the perspective of ensuring satisfactory battery capacity. In addition, the mass of the positive electrode active material layer 14 provided per unit area of the positive electrode current collector 12 should be 50 $mg/cm^2$ or lower (for example, 40 $mg/cm^2$ or lower, and typically 20 $mg/cm^2$ or lower) from the perspective of ensuring input output characteristics. Moreover, in a constitution having a positive electrode active material layer 14 on both surfaces of the positive electrode current collector 12, as in this embodiment, it is preferable for the mass of the positive electrode active material layer 14 to be approximately equal on each surface of the positive electrode current collector 12.

The average thickness of the positive electrode active material layer 14 on each surface of the positive electrode current collector 12 should be, for example, 40 μm or higher (typically 50 μm or higher) and 100 μm or lower (typically 80 μm or lower). In addition, the density of the positive electrode active material layer 14 should be, for example, 1 to 4 $g/cm^3$ (for example, 1.5 to 3.5 $g/cm^3$). In addition, the porosity of the positive electrode active material layer 14 should be, for example, 10 to 50 vol. % (typically 20 to 40 vol. %).

In cases where one or two or more of these properties are satisfied, it is possible to maintain an appropriate quantity of voids in the positive electrode active material layer 14 and allow the non-aqueous electrolyte to infiltrate sufficiently. As a result, a wide field of reaction with charge carriers can be ensured and even higher input output characteristics can be achieved. In addition, it is possible to maintain good electrical conductivity in the positive electrode active material layer 14 and suppress an increase in resistance. Furthermore, it is possible to ensure mechanical strength (shape retention properties) of the positive electrode active material layer 14 and achieve even better cycle characteristics.

Moreover, in the present specification, "porosity" means a value obtained by dividing the total pore volume ($cm^3$), as determined using a mercury porosimeter, by the apparent volume ($cm^3$) of the active material layer, and multiplying by 100. The apparent volume can be calculated by multiplying the area ($cm^2$), as seen from above, by the thickness (cm).

The method for producing this type of positive electrode sheet 10 is not particularly limited, but, for example, a paste-like or slurry-like composition (a positive electrode active material layer-forming slurry) is first prepared by dispersing a positive electrode active material and other materials able to be used if necessary in appropriate solvent. Next, the prepared positive electrode active material layer-forming slurry is applied to the strip-shaped positive electrode current collector 12, and the solvent contained in the slurry is removed. In this way, it is possible to prepare the positive electrode sheet 10 in which the positive electrode active material layer 14 is provided on the positive electrode current collector 12. A water-based solvent or organic solvent can be used as this solvent, and it is possible to use, for example, N-methyl-2-pyrrolidone (NMP). In addition, the slurry can be applied by using an appropriate coating device, such as a gravure coater, a slit coater, a die coater, a comma coater or a dip coater. In addition, the solvent can be removed by using a conventional means (for example, drying by heating or vacuum drying).

Moreover, the properties (that is, average thickness, density and porosity) of this type of positive electrode active material layer 14 can be adjusted by forming the positive electrode active material layer 14 and then subjecting the positive electrode sheet 10 to an appropriate pressing process. The pressing treatment can be a conventional publicly known pressing process, such as a roll pressing process or flat plate pressing process. In addition, this pressing process may be carried out once only or repeated two or more times.

<<Negative Electrode Sheet 20>>

The negative electrode sheet 20 is provided with the negative electrode current collector 22 and the negative electrode active material layer 24, which is formed on the negative electrode current collector 22 and contains at least the negative electrode active material. An electrically conductive material consisting of a metal exhibiting good electrical conductivity (for example, copper, nickel, titanium or stainless steel) can be advantageously used as the negative electrode current collector 22.

<Negative Electrode Active Material Layer 24>

The negative electrode active material layer 24 contains at least the negative electrode active material. One or two or more materials known to be able to be used as negative electrode active materials for non-aqueous electrolyte secondary batteries can be used without particular limitation as the negative electrode active material. Preferred examples thereof include a variety of carbon materials such as graphite, poorly graphitizable carbon (hard carbon), readily graphitizable carbon (soft carbon), and carbon nanotubes. Graphite-based materials such as natural graphite and artificial graphite (and especially natural graphite) can be advantageously used due to exhibiting excellent electrical conductivity and high energy density. In general, when batteries having a graphite-based material in a negative electrode are repeatedly charged and discharged under harsh conditions (for example, in high temperature environments and/or at high input output densities), components contained in the non-aqueous electrolyte (for example, the non-aqueous solvent or supporting electrolyte) gradually decompose, which can lead to a reduction in energy density. However, in the invention disclosed here, a preferred coating film derived from a BP-oxalate compound is formed on the surface of the negative electrode active material, meaning that this decomposition hardly occurs and high energy density can be achieved over a long period of time.

The form of the negative electrode active material is not particularly limited, but may be, for example, particulate or powdery. The average particle diameter of a particulate negative electrode active material may be 20 μm or lower (typically 1 to 20 μm, for example 5 to 15 μm). In addition, the specific surface area of a particulate negative electrode active material may be 1 $m^2/g$ or higher (typically 2.5 $m^2/g$ or higher, for example 2.8 $m^2/g$ or higher) and 10 $m^2/g$ or lower (typically 3.5 $m^2/g$ or lower, for example 3.4 $m^2/g$ or lower). A negative electrode active material that satisfies one or two of these properties can ensure a wide field of reaction with charge carriers and achieve even higher battery characteristics (for example, high input output characteristics) even if a coating film derived from a BP-oxalate compound is formed on the surface of the negative electrode active material.

Moreover, in the present specification, "average particle diameter" means the particle diameter corresponding to a cumulative 50% from the small particle diameter side in a volume-based particle size distribution measured using particle size distribution measurements obtained using a conventional laser diffraction/light-scattering method (that is, the $D_{50}$ particle diameter or median diameter). In addition, in the present specification, "BET specific surface area ($m^2/g$)" means a value determined by using a BET method (for example, a BET single point method) to analyze the quantity of gas adsorbed, which is measured using a gas adsorption method using nitrogen ($N_2$) gas as an adsorbate (a fixed volume type adsorption method).

In addition to the negative electrode active material, the negative electrode active material layer 24 may, if necessary, contain one or two or more materials able to be used as constituent components of negative electrode active material layers in conventional non-aqueous electrolyte secondary batteries. Examples of such materials include binders and a variety of additives. For example, a polymer material such as a styrene-butadiene rubber (SBR), poly(vinylidene fluoride) (PVdF) or polytetrafluoroethylene (PTFE) can be advantageously used as the binder. In addition, a variety of additives, such as thickening agents, dispersing agents and electrically conductive materials, can be used as appropriate. For example, carboxymethyl cellulose (CMC) or methyl cellulose (MC) can be advantageously used as a thickening agent.

The proportion of the negative electrode active material relative to the overall negative electrode active material layer 24 should be approximately 50 mass % or higher, and it is generally preferable for this proportion to be 90 to 99 mass % (for example, 95 to 99 mass %). In cases where a binder is used, the proportion of the binder relative to the overall negative electrode active material layer 24 can be, for example, approximately 1 to 10 mass %, and it is generally preferable for this proportion to be approximately 1 to 5 mass %. In cases where a thickening agent is used, the proportion of the thickening agent relative to the overall negative electrode active material layer 24 can be, for example, approximately 0.1 to 10 mass %, and it is generally preferable for this proportion to be approximately 1 to 5 mass %.

The mass of the negative electrode active material layer 24 provided per unit area of the negative electrode current collector 22 (that is, the mass per unit area) should be 3 $mg/cm^2$ or higher (typically 5 $mg/cm^2$ or higher, for example 7 $mg/cm^2$ or higher) on each side of the negative electrode current collector 22 from the perspective of ensuring satisfactory battery capacity. In addition, the mass of the negative electrode active material layer 24 provided per unit area of the negative electrode current collector 22 should be 30 $mg/cm^2$ or lower (typically 20 $mg/cm^2$ or lower, for example 15 $mg/cm^2$ or lower) from the perspective of ensuring input output characteristics. Moreover, in a constitution having a negative electrode active material layer 24 on both surfaces of the negative electrode current collector 22, as in this embodiment, it is preferable for the mass of the negative electrode active material layer 24 to be approximately equal on each surface of the negative electrode current collector 22.

The average thickness of the negative electrode active material layer 24 on each surface of the negative electrode current collector should be, for example, 40 μm or higher (and preferably 50 μm or higher) and 100 μm or lower (and preferably 80 μm or lower). In addition, the density of the negative electrode active material layer 24 should be, for example, approximately 0.5 to 2 $g/cm^3$ (and preferably 1 to 1.5 $g/cm^3$). In addition, the porosity of the negative electrode active material layer 24 should be, for example, approximately 5 to 50 vol. % (and preferably 35 to 50 vol. %).

If one or two or more of these properties are satisfied, it is possible to achieve even higher energy density. In addition, it is possible to maintain an appropriate quantity of voids in the negative electrode active material layer 24 and allow the non-aqueous electrolyte to infiltrate sufficiently. As a result, a wide field of reaction with charge carriers can be ensured and even higher input output characteristics can be achieved. Furthermore, it is possible to maintain a suitable interface with the non-aqueous electrolyte and achieve even higher durability (for example, cycle characteristics).

The method for producing this type of negative electrode sheet 20 is not particularly limited, but, for example, a paste-like or slurry-like composition (a negative electrode active material layer-forming slurry) is first prepared by dispersing a negative electrode active material and other materials able to be used if necessary in appropriate solvent. Next, the prepared negative electrode active material layer-forming slurry is applied to the strip-shaped negative electrode current collector 22, and the solvent contained in the slurry is removed. In this way, it is possible to prepare the negative electrode sheet 20 in which the negative electrode active material layer 24 is provided on the negative electrode current collector 22. A water-based solvent or organic solvent can be used as this solvent, and it is possible to use, for example, water. Moreover, the slurry application method and solvent removal method may be the same as those used for the positive electrode sheet 10. In the same way as for the positive electrode active material layer 14, the properties (porosity, thickness and density) of the negative electrode active material layer 24 can be adjusted by carrying out an appropriate pressing process.

A coating film derived substantially from a BP-oxalate compound is formed on the negative electrode active material layer 24 (specifically, on the surface of the negative electrode active material). Typically, this coating film contains boron (B) atoms and/or phosphorus (P) atoms, oxalate ions ($C_2O_4^{2-}$) and charge carrier ions (for example, $Li^+$). Specifically, this coating film can be in a form such as $LiBO_2F$, $LiBO_3$, $LiPO_2F_2$, $LiPOF_3$ or $LiPO_4$. The interface between the negative electrode active material (typically a graphite material) and the non-aqueous electrolyte is stabilized by means of this coating film, meaning that it is possible to suppress decomposition of the non-aqueous electrolyte during subsequent charging and discharging. Here, "substantially" is a term used for the main constituent component of the coating film that contains boron atoms and/or phosphorus atoms, and typically means that 80 mol. % or more (preferably 85 mol. % or more, and more preferably 90 mol. % or more) of the coating film is derived from the BP-oxalate compound. In other words, this means that the coating film may contain components derived from compounds other than the BP-oxalate compound, for example decomposition products of other components that constitute the non-aqueous electrolyte (specifically a supporting electrolyte or non-aqueous solvent).

Moreover, qualitative and quantitative determination of the coating film formed on the surface of the negative electrode active material can be carried out by, for example, ordinary ion chromatography (IC). Specifically, the battery is first dismantled, and the negative electrode (negative electrode active material layer) is taken out from the battery, immersed in an appropriate solvent (for example, EMC), washed, cut to a prescribed size, and used as a measurement sample. Next, the measurement sample is immersed in an appropriate solvent (for example, pure water) for a prescribed period of time (for example, approximately 1 to 30 minutes), thereby extracting coating film components to be measured (ions derived from the BP-oxalate compound) into the solvent. This solution is subjected to ion chromatography measurements, and by confirming the presence of the ions to be measured (for example, $BO_2F$ ions, $BO_3$ ions, $PO_2F_2$ ions, $PO_3F$ ions and $PO_4$ ions), it is possible to confirm that the coating film is derived from the BP-oxalate compound. Even in cases where, for example, a compound other than the BP-oxalate compound but which contains boron atoms and/or phosphorus atoms is used as a component such as a supporting electrolyte, by carrying out this analysis, it is possible to confirm the presence of a coating film derived from the BP-oxalate compound rather than this other compound. In addition, by totaling the quantitative values ($\mu M$) of the ions to be measured and dividing by the area ($cm^2$) of the negative electrode active material layer, it is possible to determine the quantity ($\mu M/cm^2$) of coating film derived from the BP-oxalate compound per unit area (1 $cm^2$).

Moreover, ion chromatography is explicitly disclosed above as the means for qualitatively and quantitatively determining the coating film on the surface of the negative electrode active material, but this means is not limited to ion chromatography, and similar analysis can be carried out using, for example, conventional publicly known Inductively Coupled Plasma-Atomic Emission Spectrometry (ICP-AES), X-ray Absorption Fine Structure (XAFS), or the like.

The invention disclosed here is characterized in that the resistance value of the negative electrode active material layer falls within a prescribed range. That is, in at least a part of the negative electrode active material layer, the standard deviation ($\sigma$) of resistance values, which are measured at a plurality of points at equal intervals in a line direction extending linearly from one prescribed layering surface of the electrode body to the layering surface on the opposite side, is 3.0 to 7.2. By setting the standard deviation ($\sigma$) to fall within this range, it is possible to obtain a battery that can achieve excellent battery performance during normal usage and excellent resistance to overcharging. In a preferred aspect, the standard deviation ($\sigma$) is 3.0 to 5.0. In this way, it is possible to achieve even better battery performance during normal usage and exhibit the effect of the invention of the present application to a high level.

The standard deviation ($\sigma$) of resistance values can be determined by means of a method that includes, for example, the following steps: a negative electrode active material layer (measurement object) preparation step; a measurement point setting step; a step of measuring the resistance value at the measurement points; and a standard deviation ($\sigma$) calculation step. The various steps will now be explained.

In the negative electrode active material layer preparation step, the battery is dismantled, and the negative electrode active material layer (typically the negative electrode in which the negative electrode active material layer is supported on the negative electrode current collector) is taken out and washed with an appropriate solvent (for example, the non-aqueous solvent described later).

In the measurement point setting step, a plurality of measurement points are set at equal intervals in a line direction extending linearly from one prescribed end (a prescribed layering surface of the electrode body) to the other end (the layering surface on the opposite side). Here, it is preferable for the measurement points to be set so as to include locations close to the central part of the negative electrode active material layer. For example, in the flat wound electrode body 80 such as that shown in FIG. 2, it is preferable to set a plurality of measurement points at equal intervals in a line direction extending linearly from one end to the other end in the winding axis direction on the inside of the flat negative electrode active material layer 24, which constitutes the wound electrode body, excluding at least the outermost periphery of the negative electrode active material layer. Alternatively, in a negative electrode active material layer that constitutes a laminated electrode body having a constitution in which an approximately square positive electrode and an approximately square negative electrode are laminated, it is preferable to set a plurality of measurement points at equal intervals in a line direction extending from one corner to another corner in a diagonal manner.

The number of measurement points should be 2 or more, but it is typical to use an odd number of measurement points set at equal intervals along a line, including points close to the center of the negative electrode active material layer. In addition, a larger number of measurement points lead to the convergence of the value of the standard deviation ($\sigma$), and enables more appropriate evaluation of the state of the coating film. From this perspective, it is generally preferable for the number of measurement points to be 5 or more, typically 7 or more, and more preferably 11 or more, for example. In addition, from the perspective of operational efficiency, the number of measurement points is preferably 31 or fewer, for example 25 or fewer.

In the step of measuring the resistance value at the measurement points, resistance values can be determined by measuring alternating current impedance.

Figure 4:
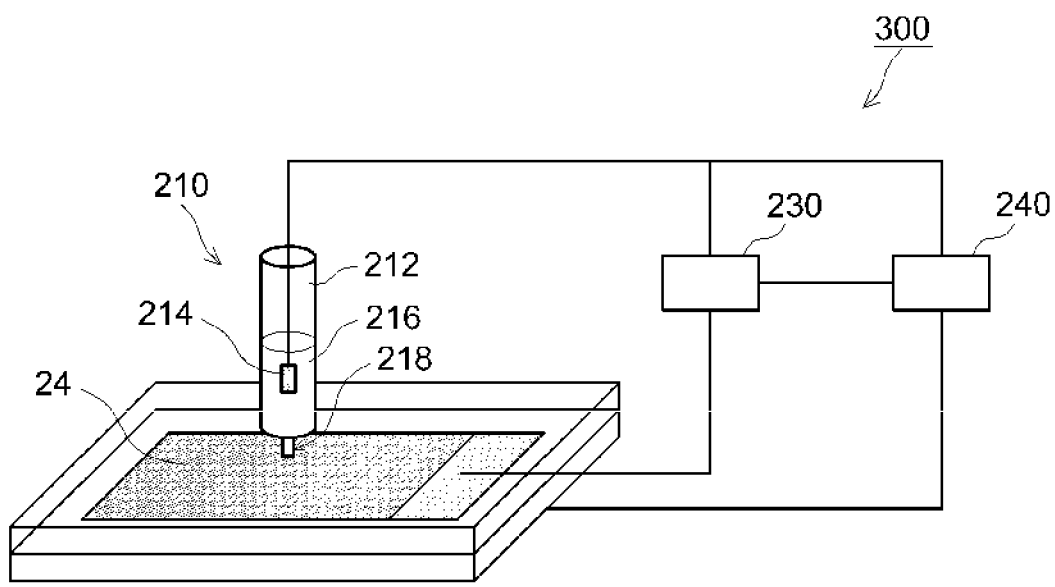
FIG. 4 is a schematic diagram for explaining a method for measuring resistance according to one embodiment.

Although not particularly limited thereto, an explanation will now be given of a method for measuring resistance by using the resistance inspection device shown in FIG. 4. In general terms, the resistance inspection device 300 shown in FIG. 4 Is provided with a Luggin tube type counter electrode 210, an alternating current impedance measurement section 230, and a control unit 240.

The Luggin tube type counter electrode 210 has a Luggin tube main body 212 and a measurement section 218 that is linked to the main body. The measurement section 218 is in contact with a measurement point on the negative electrode active material layer 24 via the non-aqueous electrolyte. In order to carry out measurements with good precision, it is preferable for the cross sectional area of the end of the measurement section (the area in contact with the negative electrode active material layer 24) to be approximately 0.01 to 0.1 $cm^2$ (typically 0.02 to 0.05 $cm^2$). In addition, it is preferable for the shape of the end of the measurement section 218 to be circular. It is preferable for the Luggin tube main body 212 to have the end shape described above and to comprise a material that exhibits excellent chemical resistance. The Luggin tube main body 212 has a prescribed non-aqueous electrolyte 216 and a counter electrode 214 disposed in the non-aqueous electrolyte. The non-aqueous electrolyte 216 can be similar to those used in conventional non-aqueous electrolyte secondary batteries. In addition, the counter electrode 214 can be, for example, the positive electrode or negative electrode mentioned above. It is preferable for the area of the counter electrode 214 to be at least 100 times (typically at least 200 times, preferably at least 300 times, and more preferably at least 500 times) the area of the end of the measurement section 218 (the area in contact with the negative electrode active material layer 24). In this way, the reactive resistance of the counter electrode 214 can be reduced to a level that can be ignored. More specifically, the resistance of the counter electrode 214 can be, for example, approximately ⅕₀th or less (and preferably ¹⁄₁₀₀th or less) of that of the detection target (the measurement point). Therefore, the resistance attributable the coating film formed on the negative electrode active material layer 24 can be measured with good precision. In the mode disclosed here, a roll-like rounded electrode is housed as the counter electrode 214 in the Luggin tube main body 212.

The alternating current impedance measurement section 230 is electrically connected to the counter electrode 214 and a measurement point on the negative electrode active material layer 24. The alternating current impedance measurement section 230 can be arbitrarily selected from among materials commonly used as conventional impedance measurement devices. For example, it is possible to use a combination of a 1287 type potentiostat/galvanostat and a 1255B type frequency response analyzer, both manufactured by Solartron. The control unit 240 controls alternating current impedance measurements, adjustments to the Luggin tube type counter electrode 210, and the like, on the basis of prescribed data.

Resistance values can be measured in accordance with steps (1) to (4) below using the resistance inspection device 300 mentioned above.

(Step 1) A Luggin tube type counter electrode such as that mentioned above is prepared.

(Step 2) The measurement section of the Luggin tube type counter electrode is brought into contact with a measurement point on the negative electrode active material layer, thereby electrically connecting the counter electrode with the measurement point on the negative electrode active material layer via the non-aqueous electrolyte.

(Step 3) An alternating current or alternating voltage is applied between the electrically connected counter electrode and measurement point, and the impedance is measured.

(Step 4) The resistance value is calculated on the basis of the impedance measurement result.

From perspectives such as measurement precision and the desired period of measurement, the frequency range used to measure the impedance can be set to, for example, 100 kHz to 0.01 Hz (typically 10 kHz to 0.1 Hz, for example 1 kHz to 0.1 Hz). In addition, the input voltage can be set to, for example, 100 to 1000 mV (typically 200 to 1000 mV, for example 300 to 1000 mV). In addition, the resistance value can be simply calculated by, for example, subtracting the value of the intersect on the high frequency side on the real axis of a Cole-Cole plot from the value of the intersect on the low frequency side on the real axis of the Cole-Cole plot. Alternatively, the resistance value can be determined by comparing the shape of the Cole-Cole plot with an appropriately selected equivalent circuit (curve fitting). In addition, the statistical standard deviation ($\sigma$) is calculated on the basis of the resistance values at the measurement points.

<<Separator Sheet 40>>

The separator sheet 40 interposed between the positive electrode sheet 10 and the negative electrode sheet 20 should have the function of insulating the positive electrode active material layer 14 from the negative electrode active material layer 24, the function of retaining the non-aqueous electrolyte, and a shutdown function. Preferred examples thereof include porous resin sheets (films) comprising resins such as polyethylene (PE), polypropylene (PP), polyesters, cellulose and polyamides. This type of porous resin sheet may have a single layer structure or a laminated structure having two or more layers (for example, a three layer structure obtained by laminating a PP layer on both surfaces of a PE layer). The average thickness of the porous resin sheet should be, for example, approximately 10 to 40 μm. In addition, the separator sheet 40 may have a constitution in which a porous heat-resistant layer is provided on one surface or both surfaces (typically one surface) of the porous resin sheet. This porous heat-resistant layer may be, for example, a layer that contains an inorganic material (preferably an inorganic filler such as alumina particles) and a binder. Alternatively, this type of porous heat-resistant layer may be a layer that contains insulating resin particles (for example, particles of polyethylene, polypropylene, or the like).

<<Non-Aqueous Electrolyte>>

The non-aqueous electrolyte contains at least a supporting electrolyte in a non-aqueous solvent. The non-aqueous electrolyte is a liquid at ordinary temperature (for example, 25° C.) and, in a preferred aspect, is always a liquid in the environment in which the battery is used (for example, in an environment having a temperature of between −30° C. and 60° C.).

The non-aqueous solvent can be an organic solvent able to be used in electrolytes of ordinary non-aqueous electrolyte secondary batteries, such as a carbonate, an ether, an ester, a nitrile compound, a sulfone compound or a lactone compound. Specific examples thereof include ethylene carbonate (EC), propylene carbonate (PC), diethyl carbonate (DEC), dimethyl carbonate (DMC), ethyl methyl carbonate (EMC). This type of non-aqueous solvent can be a single type or an appropriate combination of two or more types thereof. In a preferred aspect, a mixture of a solvent having a high dielectric constant and a solvent having a low viscosity is used. By using this type of mixed solvent, high electrical conductivity can be achieved and the electrolyte can be used across a broad temperature range. An example of a solvent having a high dielectric constant is EC, and examples of solvents having low viscosity are DMC and EMC. In addition, a non-aqueous solvent which contains one or two or more types of carbonate and in which the total volume of these carbonates is 60 vol. % or more (more preferably 75 vol. % or more, further preferably 90 vol. % or more, and potentially substantially 100 vol. %) of the overall volume of the non-aqueous solvent can be advantageously used. In another preferred aspect, ethylene carbonate accounts for 20 to 40 vol. % of the overall volume of the non-aqueous solvent.

It is possible to appropriately select a supporting electrolyte similar to those used in ordinary non-aqueous electrolyte secondary batteries as the supporting electrolyte, as long as the supporting electrolyte contains a charge carrier (for example, lithium ions, sodium ions, magnesium ions, and the like. Lithium ions in the case of a lithium ion secondary battery). For example, in cases where the charge carriers are lithium ions, lithium salts such as $LiPF_6$, $LiBF_4$, $LiClO_4$, $LiAsF_6$, $Li(CF_3SO_2)_2N$ and $LiCF_3SO_3$ can be given as examples of the supporting electrolyte. This type of supporting electrolyte may be a single supporting electrolyte or a combination of two or more types thereof. A particularly preferred example of a supporting electrolyte is $LiPF_6$. In addition, it is preferable for the non-aqueous electrolyte to be prepared in such a way that the concentration of the supporting electrolyte falls within the range 0.7 to 1.3 mol/L.

Moreover, in at least the battery assembly state (a state prior to charging treatment), the non-aqueous electrolyte contains the BP-oxalate compound. However, compounds such as those mentioned above undergo reductive decomposition at the negative electrode during charging treatment (typically during initial charging treatment), meaning that a good quality coating film is formed on, and is bound (attached) to, the surface of the negative electrode active material. Therefore, it is not necessary for this compound to remain in the non-aqueous electrolyte following initial charging treatment.

In addition, the non-aqueous electrolyte may further contain additives as long as the effect of the present invention is not significantly impaired. Examples of such additives include film-forming materials other than the BP-oxalate compound (for example, vinylene carbonate, vinylethylene carbonate and fluoroethylene carbonate), compounds able to generate gas through polymerization during overcharging (for example, biphenyl and cyclohexylbenzene), dispersing agents and thickening agents.

<<Method for Producing Non-Aqueous Electrolyte Secondary Battery>>

A non-aqueous electrolyte secondary battery such as that described above can be advantageously produced by using a production method that includes, for example, the steps mentioned below.

(1) Preparation step: An electrode body and a non-aqueous electrolyte are prepared.

(2) Construction step: A battery assembly is constructed by housing the electrode body and the non-aqueous electrolyte in a battery case.

(3) Holding step: The constructed battery assembly is held for a prescribed period of time in a low temperature region at a temperature below 25° C.

(4) Charging treatment step: Charging treatment is carried out between the positive electrode and the negative electrode.

According to this production method, a preferred coating film (that is, a coating film in which the standard deviation ($\sigma$) of resistance values is 3.0 to 7.2) is stably formed on the surface of the negative electrode active material. Each step will now be explained in order.

<(1) Preparation Step>

First, an electrode body and a non-aqueous electrolyte are prepared. The electrode body has a constitution in which a positive electrode having a positive electrode active material layer and a negative electrode having a negative electrode active material layer are laminated, with a separator interposed therebetween. The positive electrode, the negative electrode and the separator that constitute the electrode body can be the same as those already described above. Typically, the non-aqueous electrolyte contains a non-aqueous solvent, a supporting electrolyte and a BP-oxalate compound. The non-aqueous solvent and the supporting electrolyte can be the same as those already described above.

The BP-oxalate compound can be one or two or more compounds selected, without any specific limitation, from among compounds prepared using publicly known methods and compounds obtained by procuring commercially available products. For example, the BP-oxalate compound can be an oxalate complex compound having a 4-position structural moiety in which at least one oxalate ion ($C_2O_4^{2-}$) is coordinated to a boron (B) atom as the central atom (a B atom-containing oxalate salt), as shown in formula (V) and formula (VI) below. These compounds undergo reductive decomposition at the negative electrode during charging treatment (typically during initial charging treatment), form a high quality coating film having low resistance and excellent stability on the surface of the negative electrode active material, and can be deposited (bound) to the negative electrode active material.

[Chemical Formula 5]

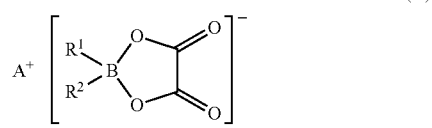

(V)

[Chemical Formula 6]

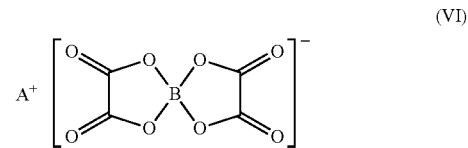

(VI)

Here, $A^+$ in formulae (V) and (VI) may be an inorganic cation or organic cation. Examples of inorganic cations include alkali metal cations such as Li, Na and K; alkaline earth metal cations such as Be, Mg and Ca; metal cations such as Ag, Zn, Cu, Co, Fe, Ni, Mn, Ti, Pd, Cr, V, Ru, Y, lanthanoids and actinoids; and protons. Examples of organic cations include tetraalkyl ammonium ions such as tetrabutyl ammonium ions, tetraethyl ammonium ions and tetramethyl ammonium ions; trialkyl ammonium ions such as triethyl-methyl ammonium ions and triethyl ammonium ions; pyridinium ions, imidazolium ions, tetraethyl phosphonium ions, tetramethyl phosphonium ions, tetraphenyl phosphonium ions, triphenyl sulfonium ions and try ethyl sulfonium ions. Preferred examples of cations include lithium ions, tetraalkyl ammonium ions and protons.

In addition, $R^1$ and $R^2$ in formula (V) can each independently be selected from among halogen atoms such as F, Cl and Br (preferably F); and perfluoroalkyl groups having 1 to 10 carbon atoms (and preferably 1 to 3 carbon atoms).

Specific examples of this type of oxalate complex compound include lithium bis(oxalato)borate (LiBOB) represented by formula (I) above and lithium difluoro oxalate borate (LBFO) represented by formula (II) above.

In addition, other examples include oxalate complex compounds having a 6-position structural moiety in which at least one oxalate ion ($C_2O_4^{2-}$) is coordinated to a phosphorus (P) atom as the central atom (a P atom-containing oxalate salt), as shown in formulae (III) and (IV) above. Moreover, in formulae (III) and (IV), examples are given in which the cation is a lithium ion, but the cation may be another cation in the same way as $A^+$ in formulae (V) and (VI). In addition, in the same way as $R^1$ and $R^2$ in formula (V), the F groups in formulae (III) and (IV) may each independently be selected from among F and other halogen atoms (for example, Cl and Br, but preferably F), and perfluoroalkyl groups having 1 to 10 carbon atoms (and preferably 1 to 3 carbon atoms).

Specific examples of such oxalate complex compounds include lithium difluoro bis(oxalato)phosphate (LPFO) represented by formula (III) above, lithium tetrafluoro oxalate phosphate represented by formula (IV) above, and lithium tris(oxalato) phosphate.

In a preferred aspect, the reduction potential (vs. Li/Li$^+$) of the BP-oxalate compound is higher than that of other components contained in the non-aqueous electrolyte (typically the non-aqueous solvent). That is, it is preferable for the BP-oxalate compound to have the highest reduction potential of all the components contained in the non-aqueous electrolyte. For example, because the reduction potential of LiBOB is approximately 1.73 V (vs. Li/Li$^+$), it is preferable for the reduction potential of the non-aqueous solvent contained in the non-aqueous electrolyte to be equivalent to, or lower than, 1.73 V (vs. Li/Li$^+$) (typically lower than 1.73 V by at least 0.1 V, for example by at least 0.5 V, and especially by at least 0.8 V). In this way, it is possible to advantageously form a coating film derived from the BP-oxalate compound on the surface of the negative electrode active material.

The added quantity of the BP-oxalate compound can vary according to, for example, the type and properties (for example, particle diameter or specific surface area) of the negative electrode active material. In general, as the average particle diameter decreases and/or the BET specific surface area increases, the preferred added quantity of the BP-oxalate compound tends to increase. Therefore, although not particularly limited, in cases where the added quantity is too low, the coating film formed on the surface of the negative electrode active material becomes thin, which leads to concerns that the durability (storage characteristics and rapid charging and discharging characteristics) of the battery will deteriorate. However, in cases where the added quantity is too high, the coating film formed on the surface of the negative electrode active material becomes thick, which leads to concerns that resistance will increase as a result of charging and discharging. Therefore, in a preferred aspect, the concentration of the BP-oxalate compound in the non-aqueous electrolyte is not lower than 0.005 mol/L (for example, not lower than 0.01 mol/L) and not higher than 0.2 mol/L (for example, not higher than 0.1 mol/L, and preferably not higher than 0.07 mol/L) relative to the non-aqueous electrolyte. In cases where the added quantity falls within this range, the effect of the invention of the present application can be exhibited to a higher level.

Typically, this type of non-aqueous electrolyte can be prepared by homogeneously dissolving the supporting electrolyte and the BP-oxalate compound in the non-aqueous solvent. Alternatively, it is possible to directly add and impregnate the BP-oxalate compound in an electrode body such as that mentioned above (typically the negative electrode active material layer or separator), and house this electrode body and the non-aqueous solvent, which contained only the supporting electrolyte, in the battery case, thereby eluting the BP-oxalate compound into the non-aqueous electrolyte.

Moreover, the quantity of the BP-oxalate compound used to construct the battery (in other words, the quantity of the BP-oxalate compound supplied to the battery case) can be approximately understood by using a method such as, for example, quantitatively determining the coating film derived from the compound contained in the positive electrode active material layer by means of a method such as the ion chromatography described above; or analyzing the non-aqueous electrolyte present in the battery case by means of ion chromatography, and quantitatively determining chemical species attributable to the BP-oxalate compound and decomposition products thereof.

<(2) Construction Step>

Next, the electrode body and the non-aqueous electrolyte are housed in the battery case. Typically, the electrode body is housed in the battery case first, and the pressure inside the battery case is then reduced to approximately −70 to −90 kPa. By then adding the non-aqueous electrolyte, it is possible for the non-aqueous electrolyte to infiltrate as far as the inner part of the electrode body. The battery case can be a material such as those already mentioned above. In addition, by sealing the open part of the battery case by means of welding or the like, it is possible to construct a non-aqueous electrolyte secondary battery assembly. Typically, the pressure inside the battery assembly following construction is approximately equal to atmospheric pressure.

<(3) Holding Step>

Next, the constructed battery assembly is held (allowed to stand) in a low temperature region at a temperature below 25° C. for a prescribed period of time. By carrying out this step, the non-aqueous electrolyte that contains the BP-oxalate compound can advantageously spread throughout the entire electrode body, meaning that the concentration of the BP-oxalate compound becomes uniform throughout the electrode body. The statement "a low temperature region at a temperature below 25° C." typically means a temperature below 20° C., for example 18° C. or lower, and preferably 15° C. or lower. The lower temperature limit depends on, for example, the properties of the negative electrode (the density or thickness of the negative electrode active material layer) or the holding time in this step, and is therefore not particularly limited, but from perspectives such as operational efficiency and cost, this lower temperature limit is typically higher than 5° C., for example 7° C. or higher, preferably 8° C. or higher, and more preferably 10° C. or higher.

In addition, the holding time in the low temperature region depends on, for example, the properties of the negative electrode (the density or thickness of the negative electrode active material layer) or the holding temperature in this step, and is therefore not particularly limited, but from perspectives such as operational efficiency and productivity, this holding time is preferably approximately 5 to 20 hours (for example, 10 to 16 hours).

(4) Charging Treatment Step>

Next, charging treatment is carried out between the positive electrode and the negative electrode. In this way, the BP-oxalate compound is reductively decomposed at the negative electrode and a preferred coating film (that is, a coating film in which the standard deviation (σ) of resistance values is 3.0 to 7.2) is formed on the surface of the negative electrode active material. This charging treatment is carried out so that the potential of the negative electrode (vs. $Li/Li^+$) is not higher than the reduction potential of the BP-oxalate compound contained in the non-aqueous electrolyte. In a preferred aspect, the charging treatment is carried out is carried out until the potential is at least 0.05 V (typically at least 0.1 V, for example at least 0.3 V, and especially 0.5 V) lower than the reduction potential of the compound contained in the electrolyte. The voltage between the positive and the negative electrode terminals in the charging treatment step (typically the maximum voltage reached) varies according to, for example, the type of BP-oxalate compound used, but should be approximately 3.9 to 4.2 V (for example 3.95 to 4.15 V).

It is possible to carry out the charging treatment using a method in which charging is carried out at a constant current (CC charging) from the start of charging until the potential of the negative electrode reaches a prescribed value (or until the voltage between the positive and negative electrode terminals reaches a prescribed value), but it is also possible to carry out charging at a constant current until this prescribed potential (or voltage) is reached, and then carry out charging using a method in which charging is carried out at a constant voltage (CCCV charging). In a preferred aspect, the charging treatment is carried out using a CCCV charging method.

The charging rate during the CC charging is not particularly limited, but if this charging rate is too low, the treatment efficiency tends to deteriorate. However, if the charging rate is too high, the formed coating film is not sufficiently compact and the positive electrode active material may deteriorate. As a result, it is preferable for the charging rate to be, for example, 0.1 to 2 C (typically 0.5 to 1.5 C, for example 0.6 to 1 C). In this way, a coating film having an appropriate degree of compactness (that is, a coating film which has a low resistance and in which a reaction with the non-aqueous electrolyte can be adequately suppressed) can be formed with good precision in a shorter time.

Moreover, the charging treatment may be carried out once, but may also be repeated two or more times, with, for example, a discharging treatment step being carried out between charging treatments. Furthermore, it is possible to use an appropriate combination of other procedures, such as procedures able to facilitate the reductive decomposition of the compound (for example, heating, pressurizing, irradiating with ultrasonic waves) as long as the battery characteristics are not adversely affected.

Figure 3:
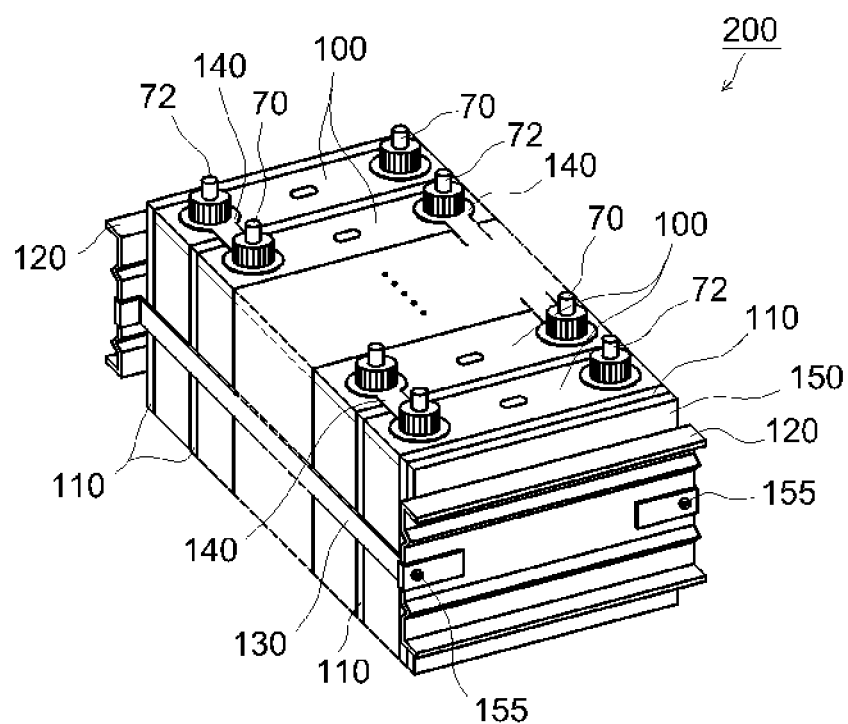
FIG. 3 is a perspective view showing a schematic representation of a battery pack obtained by combining a plurality of non-aqueous electrolyte secondary batteries (single batteries) according to one embodiment.

FIG. 3 is an example of a battery pack 200 obtained by connecting a plurality of (single) non-aqueous electrolyte secondary batteries 100 in series and/or in parallel. The (single) battery disclosed here is characterized in that the energy density and output density are higher than those of conventional batteries. Therefore, a battery pack obtained by connecting a plurality of these single batteries (typically in series) exhibits significantly higher battery characteristics.

In the mode shown in FIG. 3, the battery pack 200 is obtained by reversing a plurality (typically 10 or more, preferably 10 to 30, for example 20) non-aqueous electrolyte secondary batteries (single batteries) 100 one at a time so that the positive electrode terminals 70 and the negative electrode terminals 72 are disposed alternately, and the broad surfaces of the battery cases are aligned so as to oppose each other (in the overlaying direction). Cooling sheets 110 having prescribed shapes are interposed between the aligned single batteries 100. These cooling sheets 110 function as heat-dissipating members used to efficiently disperse heat generated inside the single batteries 100 during usage, and it is preferable for the cooling sheets 110 to have a shape that enables a cooling fluid (typically air) to be introduced between the single batteries 100 (for example, a shape in which a plurality of grooves in parallel are provided so as to extend perpendicularly from one edge of a cooling sheet to the other edge in the longitudinal direction). It is preferable to use a cooling sheet made from a metal having good thermal conductivity or a hard lightweight polypropylene or other synthetic resin.

A pair of end plates (binding plates) 120 are disposed at the ends of the aligned single batteries 100 and cooling sheets 110. In addition, it is possible to interpose a sheet-shaped spacer member 150, or a plurality thereof, as length-adjusting means between a cooling sheet 110 and an end plate 120. The aligned single batteries 100, cooling sheets 110 and spacer members 150 are bound by applying a prescribed binding pressure in the overlaying direction by means of a tightening binding band 130 that is attached in such a way as to bridge the end plates. More specifically, by attaching and fixing one end of a binding band 130 to an end plate 120 by means of a screw 155, the single batteries are bound to each other due to the prescribed binding pressure being applied in the direction of alignment. In this way, the binding pressure is also applied to the wound electrode body housed in the battery case in each single battery 100. In addition, the positive electrode terminal 70 of a single battery 100 is electrically connected to the negative electrode terminal 72 of an adjacent single battery 100 by means of a connecting member (a bus bar) 140. By connecting the single batteries 100 in series in this way, the battery pack 200 having a prescribed voltage is constructed.

The battery disclosed here can be used in a variety of applications, but is characterized in that the effect achieved by adding the BP-oxalate compound can be advantageously exhibited and is characterized by achieving durability and resistance to overcharging at high levels. Therefore, by using such characteristics, the battery disclosed here can be advantageously used as, for example, a motive power source fitted to a vehicle. The type of vehicle is not particularly limited, but examples thereof include plug-in hybrid vehicles (PHV), hybrid vehicles (HV), electric vehicles (EV), electric trucks, electric scooters, electric power assist bicycles, electric power wheelchairs and electric trains. In this way, the present invention provides a vehicle advantageously fitted with any of the non-aqueous electrolyte secondary batteries disclosed here as a motive power source. The non-aqueous electrolyte secondary battery used in the vehicle is generally in the form of the battery pack mentioned above, in which a plurality of single batteries are connected.

Several working examples relating to the present invention will now be explained, but the present invention is in no way limited to these specific examples.

Construction of Non-Aqueous Electrolyte Secondary Battery

Example 1, Example 2, and Examples 4 to 7

First, a positive electrode active material slurry was prepared by placing $LiNi_{1/3}Mn_{1/3}Co_{1/3}O_2$ (LNCM) as a positive electrode active material, acetylene black (AB) as an electrically conductive material and poly(vinylidene fluoride) (PVdF) as a binder in a mixer so that the LNCM:AB: PVdF mass ratio was 90:8:2, and then kneading while adjusting the viscosity by means of N-methylpyrrolidone (NMP). A positive electrode sheet (overall thickness: 170 μm, electrode density: 3 g/cm³) having a positive electrode active material layer on both surfaces of a positive electrode current collector was prepared by coating this slurry at a width of 96 mm on both surfaces of an aluminum foil (a positive electrode current collector) having a thickness of 15 μm, drying the slurry, and then pressing.

Next, a negative electrode active material slurry was prepared by placing natural graphite (C) as a negative electrode active material, a styrene-butadiene rubber (SBR) as a binder and carboxymethyl cellulose (CMC) as a dispersing agent in a mixer so that the C:SBR:CMC mass ratio was 98:1:1, and then kneading while adjusting the viscosity by means of ion exchanged water. A negative electrode sheet (overall thickness: 150 μm, electrode density: 1.1 g/cm³) having a negative electrode active material layer on both surfaces of a negative electrode current collector was prepared by coating this slurry at a width of 100 mm on both surfaces of a strip-shaped copper foil (a negative electrode current collector) having a thickness of 10 μm, drying the slurry, and then pressing.

A flat wound electrode body was prepared by laminating and winding the prepared positive electrode sheet and negative electrode sheet together with two separator sheets (here, a separator having a three layer structure obtained by laminating a polypropylene (PP) sheet on both surfaces of a polyethylene (PE) sheet and having a thickness of 20 μm and width of 110 mm was used), and then squeezing the obtained laminated body from the sides. Next, the positive electrode terminal and the negative electrode terminal were attached to the lid of the battery case, and these terminals were welded to the positive electrode current collector and the negative electrode current collector exposed at the edge of the wound electrode body. In this way, the wound electrode body connected to the lid was placed in the square battery case through the open part of the battery case, and the lid was then welded onto the open part. Next, the pressure inside the battery case was reduced to −90 kPa, the non-aqueous electrolyte was introduced via an electrolyte introduction hole provided in the lid of the battery case, and the non-aqueous electrolyte was allowed to impregnate into the wound electrode body. The non-aqueous electrolyte was one obtained by dissolving $LiPF_6$ as a supporting electrolyte at a concentration of 1.1 mol/L in a mixed solvent containing ethylene carbonate (EC), dimethyl carbonate (DMC) and ethylmethyl carbonate (EMC) at a EC:DMC:EMC volume ratio of 30:40:30, and further dissolving lithium bis(oxalato) borate (LiBOB) as a BP-oxalate compound at a concentration of 0.05 mol/L. Two of each of these lithium ion secondary battery assemblies (Example 1, Example 2, and Examples 4 to 7) were constructed in this way. Moreover, the pressure inside the battery case following the introduction of the non-aqueous electrolyte was atmospheric pressure.

Next, the constructed battery assemblies were held under the conditions (temperature and time) shown in Table 1, and then subjected to an initial charging treatment in an environment at 25° C. Specifically, each constructed battery assembly was subjected to CC charging at a charging rate of 1 C until the voltage between the positive and negative electrode terminals reached 4.1 V, and then subjected to CV charging until the current value reached 0.02 C. In this way, a boron atom-containing coating film derived substantially from the oxalate complex compound was formed on the surface of the negative electrode active material.

Example 3

In this example, two lithium ion secondary batteries (Example 3) were constructed in the same way as described above, except that the pressure during the pressing was adjusted so that the density of the negative electrode active material layer was 1.0 g/cm³.

TABLE 1

|  | Battery assembly holding | | Negative electrode active material layer | | | |
| --- | --- | --- | --- | --- | --- | --- |
|  | Temperature (° C.) | Time (h) | Density (g/cm³) | Standard deviation (σ) of resistance values | Quantity of heat generated (J/18 cm²) | Capacity retention rate (%) |
| Example 1 | 15 | 16 | 1.1 | 7.2 | 402 | 89.7 |
| Example 2 | 25 | 16 | 1.1 | 10.6 | 497 | 82.6 |
| Example 3 | 25 | 16 | 1.0 | 12.3 | 523 | 80.6 |
| Example 4 | 10 | 13 | 1.1 | 4.4 | 404 | 91.7 |
| Example 5 | 5 | 10 | 1.1 | 1.9 | 470 | 92.1 |
| Example 6 | 10 | 10 | 1.1 | 3.2 | 413 | 92.7 |
| Example 7 | 15 | 13 | 1.1 | 5.5 | 389 | 91.2 |

(Measurement of Initial Capacity (Rated Capacity))

Following the initial charging treatment, the lithium ion secondary batteries of Examples 1 to 7 were measured in terms of rated capacity at 25° C. at a voltage range of 3.0 to 4.1 V, using the following steps 1 to 3.

(Step 1) The battery is subjected to constant current discharging at a discharging rate of 1 C until the voltage reaches 3.0 V, subjected to constant voltage discharging for 2 hours, and then allowed to rest for 10 minutes.

(Step 2) The battery is subjected to constant current charging at a charging rate of 1 C until the voltage reaches 4.1 V, subjected to constant voltage charging for 2.5 hours, and then allowed to rest for 10 minutes.

(Step 3) The battery is subjected to constant current discharging at a discharging rate of 1 C until the voltage reaches 3.0 V, subjected to constant voltage discharging for 2 hours, and then allowed to rest for 10 minutes.

Next, the initial capacity is deemed to be the discharge capacity (CCCV discharge capacity) when discharging the battery at constant voltage discharging after the constant current discharging in Step 3. In all of the batteries of Examples 1 to 7, it was confirmed that the rated capacity was achieved.

(Lithium Precipitation Test)

Following the rated capacity measurements, the lithium ion secondary batteries of Examples 1 to 7 were subjected to a low temperature pulse cycle test consisting of a charging pattern and equivalent discharging pattern that simulated a charging current and time that would occur when a vehicle undergoes slipping and gripping at low temperatures. Specifically, the battery was first adjusted to a charged state corresponding to a SOC of 60% in an environment having a temperature of 25° C. Next, the battery was subjected to a 6000 cycle rectangular wave cycle test involving a pulsed charging pattern consisting of the following steps 1 and 2 in an environment at a temperature of 0° C.

(Step 1) The battery is subjected to constant current pulsed charging for 10 seconds at a charging rate of 20 C, and then allowed to rest for 5 seconds.

(Step 2) The battery is subjected to constant current pulsed discharging for 10 seconds at a discharging rate of 20 C, and then allowed to rest for 5 seconds.

Next, the discharge capacity (capacity following the pulse test) was measured under the same conditions as those used for the initial capacity, and the ratio of the discharge capacity to the initial capacity was calculated as "(battery capacity following pulse test/initial capacity)×100". The results are shown in the "Capacity retention rate" column in Table 1.

(Measurement of Resistance)

Following the initial charging treatment, the lithium ion secondary batteries of Examples 1 to 7 were discharged to a voltage of 3 V (a charged state corresponding to a SOC of 0%) and then dismantled, and the negative electrode was taken out. The negative electrode was gently cleaned using a non-aqueous solvent, and a measurement sample was obtained by cutting a sample having a width of 100 mm and a length of 50 mm from a flat part of the inner side of the wound electrode body. This measurement sample was placed in a container filled with a non-aqueous electrolyte, and 11 measurement points were set at equal intervals (5 mm intervals) in the width direction (in a line direction extending linearly from one edge towards the other edge in the winding axis direction). Next, the resistance value ($\Omega$) at each measurement point was measured by means of an alternating current impedance method using the resistance inspection device shown in FIG. 4. Moreover, the specification of the Luggin tube type counter electrode and the alternating current impedance measurement conditions are as follows.

Luggin Tube Type Counter Electrode

Luggin tube main body: Terumo syringe, no needle (made of polypropylene)

Counter electrode: Negative electrode sheet (not subjected to charging treatment, surface area of the negative electrode active material layer: 30 cm$^2$)

Electrolyte: Obtained by dissolving LiPF$_6$ at a concentration of 1.1 mol/L in a mixed solvent containing EC, DMC and EMC at a EC:DMC:EMC volume ratio of 30:40:30, and further dissolving LiBOB at a concentration of 0.05 mol/L.

End of measurement section: $\Phi$ 2 mm (cross sectional area: 0.03 cm$^2$)

Alternating Current Impedance Measurement Section

Figure 5:
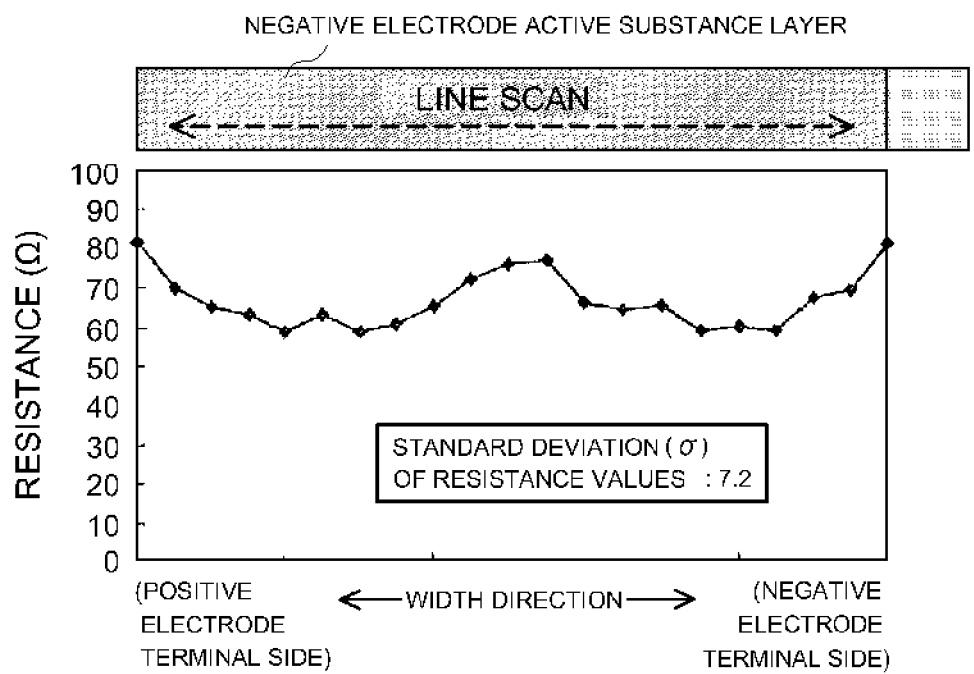
FIG. 5 is a graph showing the distribution of resistance values in a negative electrode active material layer according to one embodiment.

Devices: "1287 type potentiostat/galvanostat" and "1255B type frequency response analyzer (FRA)", both manufactured by Solartron Input voltage: 500 mV Measurement frequency range: 100 kHz to 0.5 Hz The resistance value ($R_1$ ($\Omega$)) of each measurement section was calculated by subtracting the value ($R_0$) of the intersect on the high frequency side on the real axis of a Cole-Cole plot from the value ($R_{0+1}$) of the intersect on the low frequency side on the real axis of the obtained Cole-Cole plot. As a representative example, the distribution of resistance values ($\Omega$) in the negative electrode active material layer in Example 1 is shown in FIG. 5. As shown in FIG. 5, the resistance of the negative electrode active material layer is higher in the central part and at the electrode ends, and it was understood that a higher quantity of the coating film derived substantially from the oxalate complex compound was formed in these parts. In addition, the standard deviation of the resistance values measured at the 11 measurement points was determined, and the results are shown in the "Standard deviation ($\sigma$)" column in Table 1.

As is clear from Table 1, fluctuations in resistance values (the distribution of resistance values in a line direction extending linearly from one prescribed layering surface of the electrode body to the layering surface on the opposite side), that is, the uniformity of the formed coating film, differ when the holding conditions (temperature and time) are altered after constructing the battery assembly. For example, by comparing the results of Example 1 and Example 2, in which the holding time was 16 hours, it is understood that a lower holding temperature leads to less fluctuation in resistance and a lower standard deviation ($\sigma$) of resistance values. A similar trend was seen with Example 4 and Example 7, in which the holding time was 13 hours, and Example 5 and Example 6, in which the holding time was 10 hours. In addition, by comparing the results of Example 1 and Example 7, in which the holding temperature was 15° C., it is understood that a shorter holding time leads to less fluctuation in resistance, that is, a lower standard deviation ($\sigma$) of resistance values. A similar trend was seen with Example 4 and Example 6, in which the holding temperature was 10° C.

Figure 6:
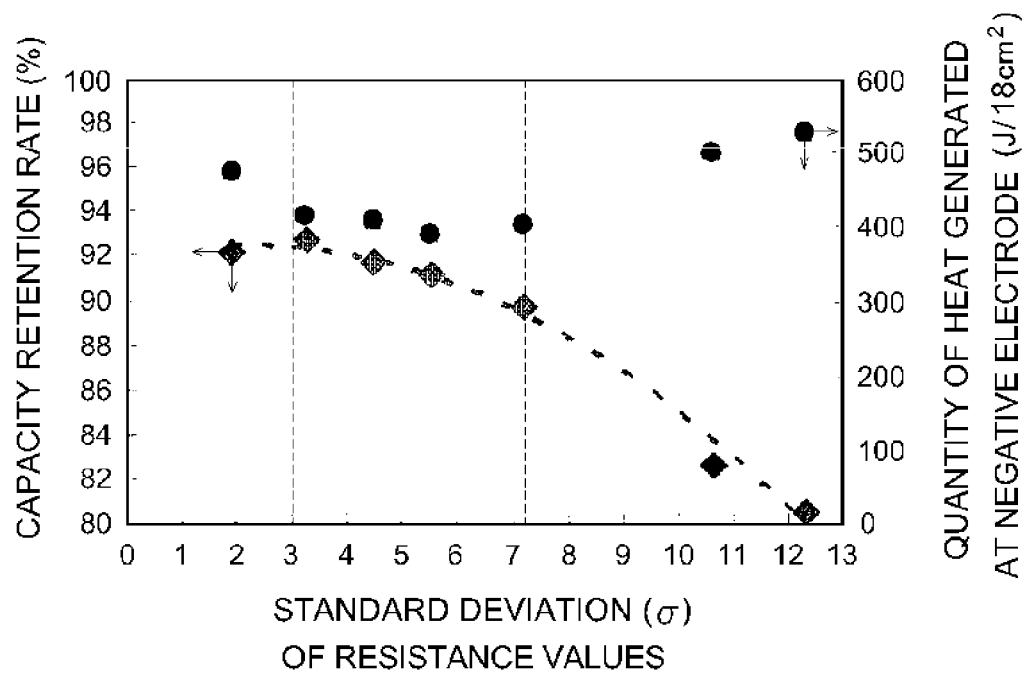
FIG. 6 is a graph showing the relationship between the standard deviation ($\sigma$) of resistance values and the capacity retention rate of the battery and the amount of heat generated in the negative electrode.

FIG. 6 shows the relationship between the standard deviation ($\sigma$) of resistance values and the capacity retention rate of the battery following a rectangular wave cycle test (shown by the black diamond markers in the graph). As is clear from Table 1 and FIG. 6, a lower (closer to 0) standard deviation ($\sigma$) of resistance values leads to a higher capacity retention rate. For example, by setting the standard deviation ($\sigma$) of resistance values to be 7.2 or lower, it is possible to achieve a capacity retention rate of 89% or higher, and by setting the standard deviation ($\sigma$) of resistance values to be 5.0 or lower (for example, 4.4 or lower) in particular, it is possible to achieve a capacity retention rate of 91% or higher. This is thought to be because forming a uniform coating film on the surface of the negative electrode active material enables more uniform charging and discharging reactions to occur. Therefore, it is understood that by setting the standard deviation ($\sigma$) of resistance values to be 7.2 or lower (and preferably 5.0 or lower), it is possible to achieve excellent battery characteristics (for example, input/output characteristics and cycle characteristics). Moreover, in the background art, holding for periods of approximately 20 hours or more (for example, 24 to 48 hours) is common at ordinary temperatures (25° C.) and temperatures higher than this. As a result, standard deviations ($\sigma$) of resistance values are 10 or higher in the background art, as shown by Example 2 and Example 3. Therefore, such excellent battery characteristics show the technical significance of the present invention.

(Measurement of Quantity of Heat Generated)

Next, the thermal stability of the negative electrode active material layer was evaluated by means of Differential Scanning calorimetry (DSC). Specifically, a measurement sample was obtained by dismantling the battery, and cutting the negative electrode (negative electrode active material layer)

into a piece having a prescribed area (3 cm×3 cm=9 cm$^2$) so as to fall within the upper limit of the calorimetry measurements. Moreover, this negative electrode was one in which the negative electrode active material layer was provided on both surfaces of the negative electrode current collector. That is, the area of the negative electrode active material layer on the measurement sample was (3 cm×3 cm)×2=18 cm$^2$. This measurement sample and the non-aqueous electrolyte were placed in a DSC apparatus (a "DSC-60" manufactured by Shimadzu Corporation), and held at a temperature of 50° C. for 1 hour in a nitrogen atmosphere, after which measurements were made while altering the temperature from 50 to 350° C. at a rate of temperature increase of 1° C./min. Next, the total quantity of heat generated (J) was deemed to be the area of the obtained DSC curve from 50 to 350° C. The results are shown in the "Quantity of heat generated" column in Table 1. In addition, FIG. 6 shows the relationship between the standard deviation ($\sigma$) of resistance values and the quantity of heat generated (shown by black circular marks on the graph). Moreover, this shows the quantity of heat generated (J) per 18 cm$^2$ of negative electrode active material layer, but by dividing this quantity of heat generated (J) by the area of the negative electrode active material layer subjected to the measurement (18 cm$^2$), it is possible to obtain the quantity of heat generated per unit area (J/cm$^2$).

As is clear from Table 1 and FIG. 6, the quantity of heat generated was high (470 J/18 cm$^2$) in Example 5, in which the standard deviation ($\sigma$) of resistance values was low (2 or lower) (that is, a uniform coating film was formed in the line direction). The reason for this is thought to be that the coating film on the negative electrode was excessively uniform, meaning that exothermic reactions occur simultaneously and the quantity of heat generated increases. In addition, the quantity of heat generated was also high (490 J/18 cm$^2$ or higher) in Example 2 and Example 3, in which the standard deviation ($\sigma$) of resistance values was high (10 or higher) (that is, significant fluctuations in terms of coating film formation occurred in the line direction). The reason for this is thought to be that there were significant fluctuations in terms of resistance of the negative electrode and localized reactions occurred at points of high resistance, meaning that the quantity of heat generated increased.

Conversely, in Example 1, Example 4, Example 6 and Example 7, in which the standard deviation ($\sigma$) of resistance values was 3 to 7.2, the quantity of heat generated could be somewhat reduced (420 J/18 cm$^2$ or lower). The reason for this is thought to be that ensuring an appropriate degree of fluctuation in the coating film enables heat generation to occur incrementally (gradually). As mentioned above, the battery according to the present invention can suppress an increase in temperature inside the battery when the battery is in an overcharged state, and can exhibit high resistance to overcharging.

Moreover, in the background art, holding for periods of approximately 20 hours or more (for example, 24 to 48 hours) is common at ordinary temperatures (25° C.) and temperatures higher than this. As a result, standard deviations ($\sigma$) of resistance values are 10 or higher in the background art, as shown by Example 2 and Example 3. Therefore, high resistance to overcharging, as mentioned above, shows the technical significance of the present invention.

Therefore, in cases where the standard deviation ($\sigma$) of resistance values is 3.0 to 7.2 (and more preferably 3.0 to 5.0), it is possible to achieve a non-aqueous electrolyte secondary battery can achieve battery characteristics (cycle characteristics) during normal usage and resistance to overcharging at high levels.

INDUSTRIAL APPLICABILITY

The battery disclosed here can be used in a variety of applications, but is characterized in that the effect achieved by adding the BP-oxalate compound can be advantageously exhibited and is characterized by achieving durability and resistance to overcharging at high levels. Therefore, by using such characteristics, the battery disclosed here can be advantageously used as, for example, a motive power source fitted to a vehicle. The type of vehicle is not particularly limited, but examples thereof include plug-in hybrid vehicles (PHV), hybrid vehicles (HV), electric vehicles (EV), electric trucks, motorized bicycles, electrically assisted bicycles, electrically powered wheelchairs and electric trains. In this way, the present invention provides a vehicle advantageously fitted with any of the non-aqueous electrolyte secondary batteries disclosed here as a motive power source. The non-aqueous electrolyte secondary battery used in the vehicle is generally in the form of the battery pack mentioned above, in which a plurality of single batteries are connected.

The present invention has been explained in detail above, but the embodiments and working examples given above are merely indicative, and the invention disclosed here encompasses modes obtained by variously modifying or altering the specific examples shown above.

REFERENCE SIGNS LIST

10: Positive electrode sheet (positive electrode)
12: Positive electrode current collector
14: Positive electrode active material layer
20: Negative electrode sheet (negative electrode)
22: Negative electrode current collector
24: Negative electrode active material layer
40: Separator sheet (separator)
50: Battery case
52: Battery case main body
54: Lid
55: Safety valve
70: Positive electrode terminal
72: Negative electrode terminal
80: Wound electrode body
100: Non-aqueous electrolyte secondary battery
110: Cooling sheet
120: End plate
130: Binding band
140: Connecting member
150: Spacer member
155: Screw
200: Battery pack
210: Luggin tube type counter electrode
212: Luggin tube
214: Counter electrode
216: Non-aqueous electrolyte
218: Measurement section
230: Alternating current impedance measurement section
240: Control unit
300: Resistance inspection device

The invention claimed is:

1. A non-aqueous electrolyte secondary battery comprising an electrode body and a non-aqueous electrolyte, wherein the electrode body is obtained by laminating a positive electrode having a positive electrode active material layer and a negative electrode having a negative electrode active material layer, with a separator interposed therebetween, the negative electrode active material layer comprises a coating film which is derived substantially from an oxalate complex compound and which contains boron atoms and/or phosphorus atoms, and in at least a part of the negative electrode active material layer, the standard deviation (σ) of resistance values, which are measured at a plurality of measurement points at equal intervals on a line extending linearly from one edge towards the other edge in the direction of impregnating the negative electrode active material layer with the non-aqueous electrolyte, is 3.0Ω to 7.2Ω.

2. The non-aqueous electrolyte secondary battery according to claim 1, wherein the standard deviation (σ) is 3.0Ω to 5.0Ω.

3. The non-aqueous electrolyte secondary battery according to claim 1, wherein the resistance value is measured by bringing a Luggin tube type counter electrode into contact with a measurement point on the negative electrode active material layer.

4. The non-aqueous electrolyte secondary battery according to claim 1, wherein the standard deviation (σ) is a value calculated on the basis of resistance values measured at at least 5 measurement points.

5. The non-aqueous electrolyte secondary battery according to claim 1, wherein the electrode body is a flat wound electrode body which is provided with:

a strip-shaped positive electrode obtained by forming on a strip-shaped positive electrode current collector a positive electrode active material layer having a prescribed width in the longitudinal direction of the strip-shaped positive electrode current collector, a strip-shaped negative electrode obtained by forming on a strip-shaped negative electrode current collector a negative electrode active material layer, which has a greater width than the positive electrode active material layer, in the longitudinal direction of the strip-shaped negative electrode current collector; and a strip-shaped separator, and in which the strip-shaped positive and negative electrodes are laminated, with a separator interposed therebetween, and wound in the longitudinal direction, wherein the resistance value is a resistance value measured at a plurality of measurement points at equal intervals on a line extending linearly from one edge towards the other edge in the winding axis direction in the inner flat part, excluding at least the outermost periphery, of the negative electrode active material layer that constitutes the flat wound electrode body.

6. A method for producing the non-aqueous electrolyte secondary battery according to claim 1, the method including:

preparing an electrode body, which is obtained by laminating a positive electrode having a positive electrode active material layer and a negative electrode having a negative electrode active material layer, with a separator interposed therebetween, and a non-aqueous electrolyte containing an oxalate complex compound that contains boron atoms and/or phosphorus atoms;

constructing a battery assembly by housing the electrode body and the non-aqueous electrolyte in a battery case;

holding the constructed battery assembly in a low temperature region at a temperature below 25° C. for a prescribed period of time; and carrying out charging treatment between the positive electrode and the negative electrode.

7. The production method according to claim 6, wherein the temperature in the low temperature region is adjusted to 10 to 15° C.

8. The production method according to claim 6, wherein the holding time in the low temperature region is 5 to 20 hours.

9. The production method according to claim 6, wherein lithium bis(oxalato)borate is used as the oxalate complex compound.

10. A battery pack obtained by electrically connecting a plurality of the non-aqueous electrolyte secondary batteries according to claim 1.

* * * * *